(12) United States Patent
Keenan et al.

(10) Patent No.: US 10,598,048 B2
(45) Date of Patent: Mar. 24, 2020

(54) AUXILIARY ROTATION DEVICE FOR A GAS TURBINE ENGINE AND A METHOD OF COOLING A ROTOR OF A GAS TURBINE ENGINE USING AN AUXILIARY ROTATION DEVICE

(71) Applicant: ROLLS-ROYCE plc, London (GB)

(72) Inventors: Michael P. Keenan, Sheffield (GB); Stewart T. Thornton, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 15/954,746

(22) Filed: Apr. 17, 2018

(65) Prior Publication Data

US 2018/0306065 A1  Oct. 25, 2018

(30) Foreign Application Priority Data

Apr. 21, 2017  (GB) .................................. 1706361.1

(51) Int. Cl.
| | | |
|---|---|---|
| *F01D 25/36* | (2006.01) | |
| *F01D 15/10* | (2006.01) | |
| *F02C 7/18* | (2006.01) | |

(52) U.S. Cl.
CPC ............. *F01D 25/36* (2013.01); *F01D 15/10* (2013.01); *F02C 7/18* (2013.01); *F05D 2220/323* (2013.01); *F05D 2220/76* (2013.01); *F05D 2260/221* (2013.01); *F05D 2260/42* (2013.01)

(58) Field of Classification Search
USPC ....................................... 290/52; 60/772, 39
See application file for complete search history.

(56) References Cited

U.S. PATENT DOCUMENTS

| | | | |
|---|---|---|---|
| 4,733,529 A | | 3/1988 | Nelson et al. |
| 10,384,926 B1 | * | 8/2019 | Kaufman ............... F25J 1/0228 |
| 2009/0301053 A1 | | 12/2009 | Geiger |
| 2013/0091850 A1 | | 4/2013 | Francisco |
| 2018/0002025 A1 | * | 1/2018 | Lents ..................... B64D 27/10 |
| 2018/0118364 A1 | * | 5/2018 | Golshany ............... B64D 35/08 |
| 2019/0003398 A1 | * | 1/2019 | Gibson ................... F02C 7/268 |
| 2019/0302706 A1 | * | 10/2019 | Curtis ................... G05B 13/021 |

FOREIGN PATENT DOCUMENTS

EP  3205848  8/2017

OTHER PUBLICATIONS

Great Britain Search Report dated Oct. 11, 2017, issued in GB Patent Application No. 1706361.1.

* cited by examiner

*Primary Examiner* — Pedro J Cuevas
(74) *Attorney, Agent, or Firm* — Oliff PLC

(57) ABSTRACT

There is disclosed an auxiliary rotation device 28 for a gas turbine engine 10. The auxiliary rotation device 28 comprises: an electric machine 30 configured to be coupled to a rotor of the gas turbine engine 10; and a dedicated electrical storage device 32 coupled to the electric machine 30. During a period of powered operation of the gas turbine engine 10 the electric machine 30 is configured to act as a generator so as to charge the dedicated electrical storage device 32. Following the period of powered operation of the gas turbine engine 10 the electric machine 30 is configured to act as a motor by discharging the dedicated electrical storage device 32 so as to cause the rotor to rotate for a period of time to provide even cooling of the rotor around its circumference. There is also disclosed a method of cooling a rotor of a gas turbine engine 10 using an auxiliary rotation device 28.

16 Claims, 3 Drawing Sheets

AUXILIARY ROTATION DEVICE FOR A GAS TURBINE ENGINE AND A METHOD OF COOLING A ROTOR OF A GAS TURBINE ENGINE USING AN AUXILIARY ROTATION DEVICE

CROSS-REFERENCE TO RELATED APPLICATIONS

This specification is based upon and claims the benefit of priority from UK Patent Application Number 1706361.1 filed on 21 Apr. 2017, the entire contents of which are incorporated herein by reference.

BACKGROUND

1. Field of the Disclosure

The disclosure relates to an auxiliary rotation device for a gas turbine engine and a method of cooling a rotor of a gas turbine engine using an auxiliary rotation device.

2. Description of the Related Art

Gas turbine engines typically comprise a compressor having one or more compressor rotors and a turbine comprising one or more turbine rotors. The compressor and turbine rotors are housed within a compressor casing and turbine casing respectively. During operation of the gas turbine engine, the compressor and turbine rotors are exposed to high temperatures. Following operation of the gas turbine engine, the compressor and turbine rotors cool down at standstill. During this period, convection-induced differences in temperature occur between the bottom and the top of the compressor and turbine rotors and the compressor and turbine casings. These temperature differences can cause warpage of the compressor and turbine rotors, resulting in what is known as rotor bow. Said temperature differences can also cause bending of the casing, commonly referred to as casing bow. Restarting the engine while the rotor is bowed can lead to damage to the engine through vibration or through contact between the rotor and the surrounding casing. The engine can therefore only be restarted once the rotor bow has reduced to an acceptable level after a lengthy cooling period or after rotating for a period of time prior to starting.

It is therefore desirable to provide a way of overcoming or alleviating this issue.

SUMMARY

In accordance with a first aspect, there is provided a gas turbine engine comprising an auxiliary rotation device. The auxiliary rotation device comprises: an electric machine configured to be coupled to a rotor of the gas turbine engine; and a dedicated electrical storage device coupled (for example at least electrically coupled/connected) to the electric machine. During a period of powered operation of the gas turbine engine the electric machine is configured to act as a generator so as to charge the dedicated electrical storage device. Following the period of powered operation of the gas turbine engine the electric machine is configured to act as a motor by discharging the dedicated electrical storage device so as to cause the rotor to rotate for a period of time to provide even cooling of the rotor around its circumference. The electric machine ceases to rotate the rotor when the dedicated electrical storage device is discharged such that insufficient charge remains to rotate the rotor; such that the period of time over which the rotor rotates is determined by the capacity of the dedicated electrical storage device.

The electric machine may be said to be configured to be mechanically coupled to the rotor, for example such that the electric machine may rotational drive and/or be rotationally driven by, the rotor.

The rotor may be, for example, any one or more of a compressor rotor, a turbine rotor and a shaft, for example a shaft that connects a turbine rotor and a compressor rotor. For example, the term rotor may refer generally to the combination of a compressor rotor, turbine rotor and shaft connecting a turbine rotor and compressor rotor.

The electric machine may be configured to automatically begin rotating the rotor following the period of powered operation of the gas turbine engine.

The dedicated electrical storage device may be configured to automatically discharge when it is no longer being charged following the period of powered operation of the gas turbine engine.

The capacity of the dedicated electrical storage device may be such that during the period of powered operation of the gas turbine engine, the dedicated electrical storage device is fully charged. The electric machine ceases to rotate the rotor when the dedicated electrical storage device is discharged such that insufficient charge remains to rotate the rotor. The period of time over which the rotor rotates is thus determined by the capacity of the dedicated electrical storage device.

The rotor may be a rotor of a compressor and/or a turbine.

The dedicated electrical storage device may be a battery or a capacitor.

The electrical energy stored in the dedicated electrical storage device may solely power the electric machine.

The electric machine may be configured to rotate the rotor slow enough to prevent oil circulation.

The electric machine may be configured to rotate the rotor at a rate of between 0.1 and 20 revolutions per minute.

A gas turbine engine may comprise an auxiliary rotation device as described in any preceding statement.

An aircraft may comprise a gas turbine engine and auxiliary rotation device as described in any preceding statement.

The gas turbine engine may comprise:
a compressor comprising a compressor rotor;
a turbine comprising a turbine rotor;
a shaft connecting the compressor rotor to the turbine rotor.

Such a gas turbine engine according to this aspect also comprises the auxiliary rotation device as described and/or claimed herein, wherein the electric machine is coupled to one or more of the compressor rotor, turbine rotor and shaft. The electric machine may be said to be mechanically coupled to one or more of the compressor rotor, turbine rotor and shaft, for example such that the electric machine may rotational drive and/or be rotationally driven by, one or more of the compressor rotor, turbine rotor and shaft.

According to an aspect, there is provided a method of cooling a rotor of a gas turbine engine using an auxiliary rotation device, the method comprising: during a period of powered operation of the gas turbine engine, charging a dedicated electrical storage device of the auxiliary rotation device via an electric machine of the auxiliary rotation device acting as a generator coupled to the rotor of the gas turbine engine; following the period of powered operation of the gas turbine engine, discharging the dedicated electrical storage device such that the electric machine acts as a motor so as to cause the rotor to rotate for a period of time to provide even cooling of the rotor around its circumference. The electric machine ceases to rotate the rotor when the dedicated electrical storage device is discharged such that insufficient charge remains to rotate the rotor; such that the period of time over which the rotor rotates is determined by the capacity of the dedicated electrical storage device.

The electric machine may automatically begin rotating the rotor following the period of powered operation of the gas turbine engine.

The dedicated electrical storage device may automatically discharge when it is no longer being charged following the period of powered operation of the gas turbine engine.

The capacity of the dedicated electrical storage device may be such that during the period of powered operation of the gas turbine engine, the dedicated electrical storage device is fully charged. The electric machine ceases to rotate the rotor when the dedicated electrical storage device is discharged such that insufficient charge remains to rotate the rotor. The period of time over which the rotor rotates is thus determined by the capacity of the dedicated electrical storage device.

BRIEF DESCRIPTION OF THE DRAWINGS

For a better understanding of the disclosure and to show more clearly how it may be brought into effect, the disclosure will now be described, by way of reference only, to the accompanying figures, in which.

DETAILED DESCRIPTION OF THE DISCLOSURE

Figure 1:
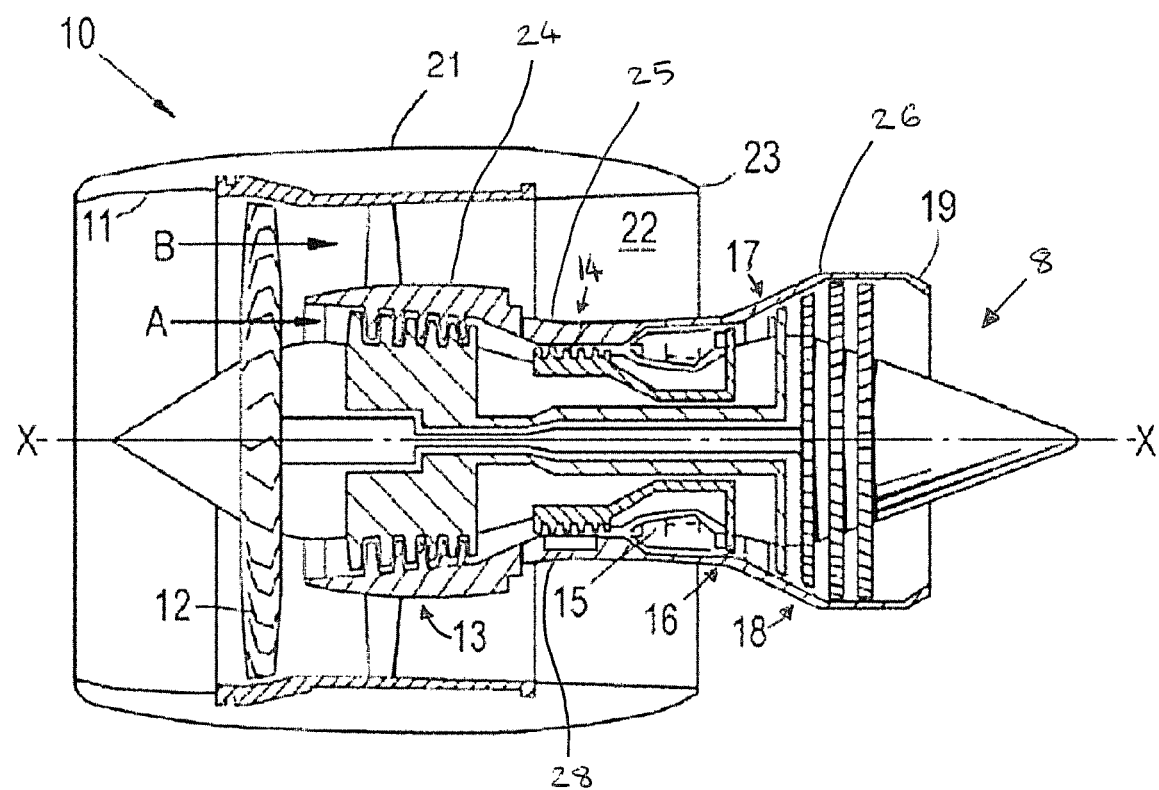
FIG. 1 schematically shows a gas turbine engine having an auxiliary rotation device.

FIG. 1 shows a ducted fan gas turbine engine 10 having a principal and rotational axis X-X. The gas turbine engine 10 has a main gas generator section 8 comprising, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The intermediate pressure compressor 13 comprises an intermediate pressure compressor casing 24 disposed at an upstream portion of the main gas generator section 8. The high-pressure compressor 14 comprises a separate high-pressure compressor casing 25 disposed downstream of the intermediate pressure compressor casing 24. The high-pressure turbine 16, the intermediate pressure turbine 17 and the low-pressure turbine 18 comprise a turbine casing 26 disposed at a downstream portion of the main gas generator section 8. A plurality of stator vanes are secured to each of the intermediate pressure compressor casing 24, the high-pressure compressor casing 25 and the turbine casing 26. The gas turbine engine 10 further comprises an auxiliary rotation device 28, which, in the arrangement shown in FIG. 1, is positioned within the high-pressure compressor casing 25.

The intermediate pressure compressor 13, the high-pressure compressor 14, the high-pressure turbine 16, the intermediate pressure turbine 17 and the low-pressure turbine 18 each further comprise one or more rotor assemblies (alternatively referred to as "spools"). The rotor assemblies of the intermediate pressure compressor 13 and the high-pressure compressor 14 are housed within the intermediate pressure compressor casing 24 and the high-pressure compressor casing 25, respectively. Accordingly, the auxiliary rotation device 28 is positioned adjacent the rotor assembly of the high-pressure compressor 14. Further, the rotor assemblies of the high-pressure turbine 16, the intermediate pressure turbine 17 and the low-pressure turbine 18 are housed within the turbine casing 16. Each rotor assembly of the intermediate pressure compressor 13 and the high-pressure compressor 14 comprises a series of discs, each comprising a plurality of circumferentially arranged compressor blades, joined together so as to form an integral drum. Likewise, each rotor assembly of the high-pressure turbine 16, the intermediate pressure turbine 17 and the low-pressure turbine 18 comprises a plurality of circumferentially arranged turbine blades. The compressor and turbine casings 24, 25, 26 are sized so as to minimise the tip clearance between the compressor and turbine casings 24, 25, 26 and the compressor and turbine blades.

During powered operation of the gas turbine engine 10, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering the air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

Figure 2:
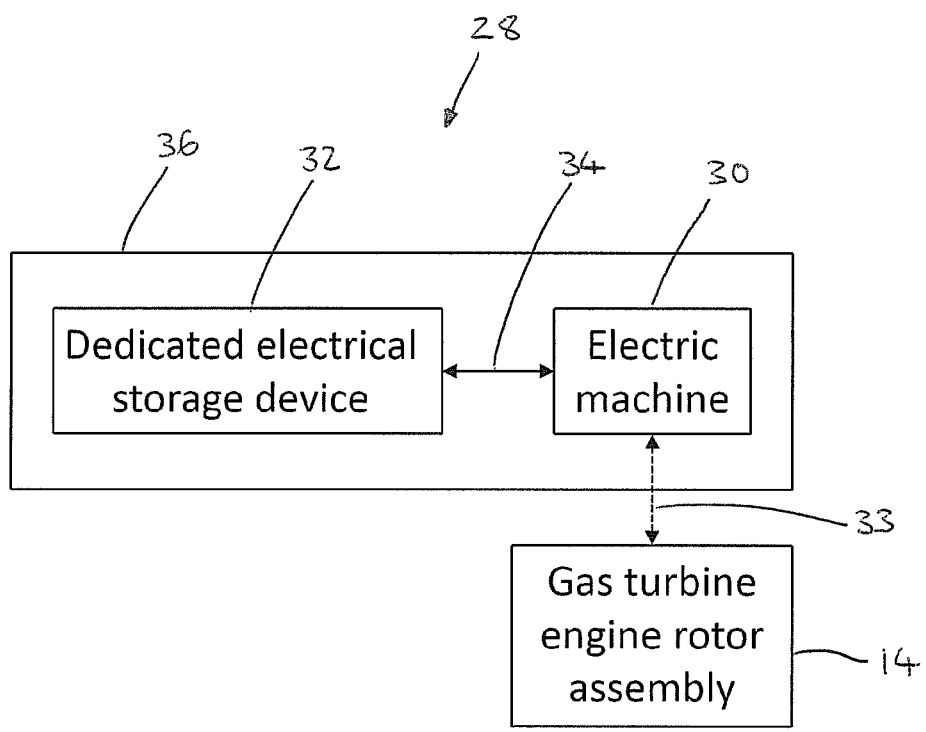
FIG. 2 schematically shows a close-up view of the auxiliary rotation device.

FIG. 2 schematically shows a close-up view of the auxiliary rotation device 28. The auxiliary rotation device 28 comprises an electric machine 30 and a dedicated electrical storage device 32 in the form of a battery. The electric machine 30 is capable of operating both as an electric generator in a generating mode and as an electric motor in a motor mode.

The electric machine 30 is coupled via coupling 33 to the rotor assembly of the high-pressure compressor 14. Further, the electric machine 30 is electrically coupled via an electrical connection 34 to the dedicated electrical storage device 32. Consequently, electrical energy can pass from the electric machine 30 into the dedicated electrical storage device 32. Likewise, electrical energy can pass from the dedicated electrical storage device 32 into the electric machine 30. The sole electrical input into the dedicated electrical storage device 32 is via the electrical connection 34. Likewise, the sole electrical input into the electric machine 30 is via the electrical connection 34. When in generating mode the electric machine 30 can, however, generate its own electrical energy, as is described below.

Figure 3:
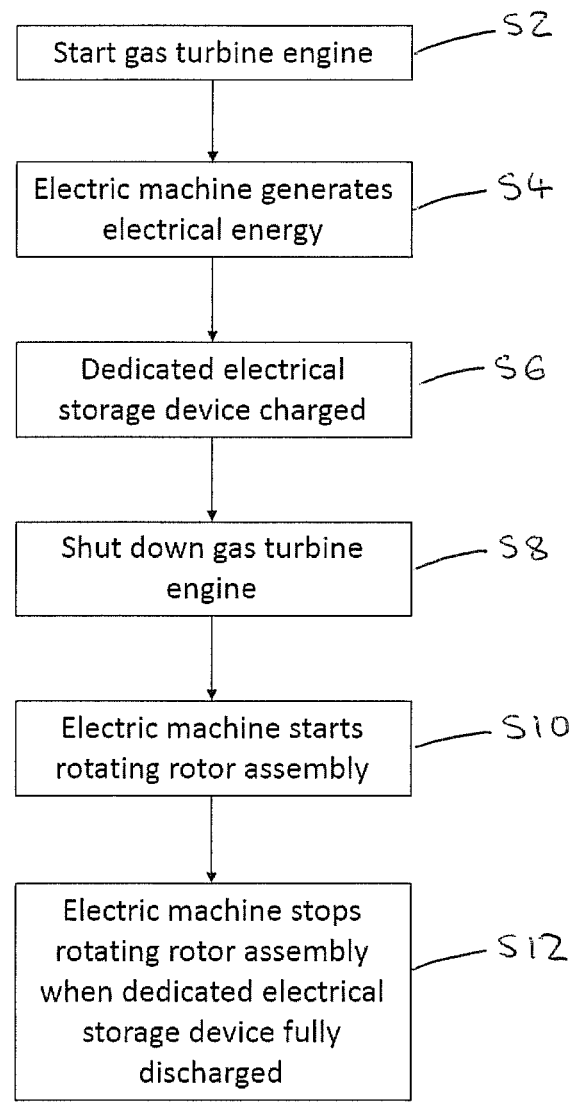
FIG. 3 shows a flowchart of a method performed by the gas turbine engine and the auxiliary rotation device.

FIG. 3 shows a flowchart of a method performed by the auxiliary rotation device 28. At step S2, the gas turbine engine 10 is started such that the rotor assembly of the intermediate pressure compressor 13, the high-pressure compressor 14, the high-pressure turbine 16, the intermediate pressure turbine 17 and the low-pressure turbine 18 rotate within their respective compressor and turbine casings 24, 25, 26. This initiates a period of powered operation of the gas turbine engine 10, in which the compressed air exhausted from the high-pressure compressor 14 is directed into the combustion equipment 15, where it is mixed with fuel and the mixture combusted so as to provide thrust.

At step S4, during the period of powered operation of the gas turbine engine 10, the electric machine 30 operates as an electric generator in a generating mode. Specifically, the electric machine 30 converts a portion of the mechanical energy of the rotor assembly of the high-pressure compressor 14 into electrical energy.

At step S6, this electrical energy passes from the electric machine 30 to the dedicated electrical storage device 32 via the electrical connection 34, thus charging the dedicated electrical storage device 32 from an uncharged state to a charged state.

At step S8, the gas turbine engine 10 is shut down. This process may occur at the end of a flight, for example. This marks the end of the period of powered operation of the gas turbine engine 10. Since the rotor assembly of the intermediate pressure compressor 13, the high-pressure compressor 14, the high-pressure turbine 16, the intermediate pressure turbine 17 and the low-pressure turbine 18 are not being powered by the expansion of hot combustion products through the high, intermediate and low-pressure turbines 16, 17, 18, their respective rotational speeds decrease.

At step S10, following the period of powered operation of the gas turbine engine 10, the electric machine 30 switches from operating as an electric generator in a generating mode to operating as an electric motor in a motor mode. This happens automatically, such that the dedicated electrical storage device 32 automatically discharges electricity when it is no longer being charged following the period of powered operation of the gas turbine engine 10.

Electrical energy stored in the dedicated electrical storage device 32 powers the electric machine 30 so as to rotate the rotor assembly of the high-pressure compressor 14. The electric machine 30 thus converts electrical energy previously stored in the dedicated electrical storage device 32 into mechanical energy of the rotor assembly of the high-pressure compressor 14. The electric machine 30 may begin to power the rotor assembly of the high-pressure compressor 14 whilst the rotor assembly of the high-pressure compressor 14 is still rotating under its own momentum from the period of powered operation of the gas turbine engine 10. Accordingly, the rotor assembly of the high-pressure compressor 14 may not stop (or may only briefly stop) rotating between the end of the period of powered operation of the gas turbine engine 10 and the electric machine 30 beginning to operate in generator mode and so the electric machine 30 does not need to overcome the inertia of the rotor assembly.

The electric machine 30 in motor mode rotates the rotor assembly of the high-pressure compressor 14 slower that the speed at which it is rotated during the period of powered operation of the gas turbine engine 10. The speed of rotation of the rotor assembly of the high-pressure compressor 14 following the period of powered operation of the gas turbine engine 10 is significantly less than that during the period of powered operation of the gas turbine engine 10. Consequently, following the period of powered operation of the gas turbine engine 10, the gas turbine engine 10 as a whole generates little or no thrust. The rotational speed is sufficiently slow to also prevent other unwanted effects. The speed of rotation may be in the region of between 0.1 and 20 revolutions per minute. Preferably, the speed of rotation may be in the region of between 0.1 and 10 revolutions per minute. Even more preferably, the speed of rotation may be in the region of between 0.5 and 2.0 revolutions per minute.

Following the period of powered operation of the gas turbine engine 10, the rotor assembly of the high-pressure compressor 14 cools down. Heat emitted by the rotor assembly rises such that the air surrounding the top portion of the rotor assembly is hotter than the air surrounding the bottom portion of the rotor assembly. Since the rotor assembly of the high-pressure compressor 14 is rotated by the electric machine 30, over a period of time each circumferential portion of the rotor assembly is equally exposed to all regions of the surrounding relatively hot and relatively cool air. Accordingly, convection-induced differences in temperature occurring between the bottom (i.e. bottom dead centre) and the top (i.e. top dead centre) of the compressor rotor is avoided, and the rotor is cooled at an equal rate around its circumference.

Consequently, rotor bow (i.e. rotor bend or warpage) of the rotor assembly of the high-pressure compressor 14 is avoided or substantially eliminated. This allows the gas turbine engine 10 to be restarted immediately following the period of powered operation (or at any point during the cooling of the rotor assembly of the high-pressure compressor 14) without the rotor assembly of the high-pressure compressor 14 (in particular the circumferentially arranged compressor blades thereof) coming into contact with the high-pressure compressor casing 25. Accordingly, damage or wear to the rotor assembly or casing 25 of the high-pressure compressor 14 is eliminated or reduced.

It should also be noted that, as mentioned previously, the high, intermediate and low-pressure turbines 16, 17, 18 respectively drive the high and intermediate pressure compressors 14, 13 and the fan 12 by suitable interconnecting shafts. Accordingly, rotation of the rotor assembly of the high-pressure compressor 14 results in rotation of the rotor assembly of the high-pressure turbine 16, and, thus, the rotor assembly of the high pressure turbine 16 is similarly evenly cooled.

At step S12, electrical energy stored in the dedicated electrical storage device 32 has discharged to such an extent that insufficient charge remains in the dedicated electrical storage device 32 and it is no longer able to power the electric machine 30 so as to rotate the rotor assembly of the high-pressure compressor 14. This automatically occurs when the electrical energy stored within the dedicated electrical storage device 32 falls below a threshold level, as either measured in absolute terms or as a percentage of the total capacity of the dedicated electrical storage device 32. Accordingly, the rotor assembly of the high-pressure compressor 14 stops rotating.

The fact that both the step of switching of the electric machine 30 into generating mode so as to allow the electrical energy stored in the dedicated electrical storage device 32 to power the electric machine 30 (i.e. step S10) and the step of the dedicated electrical storage device 32 stopping powering the electric machine 30 (i.e. step S12) are automatic eliminates the need for a control system, resulting in a simpler, more reliable, cheaper, lighter and smaller system.

As mentioned previously, the sole electrical input into the dedicated electrical storage device 32 is via the electrical connection 34, and vice versa. Accordingly, the auxiliary rotation device 28, in particular the electric machine 30 and the dedicated electrical storage device 32 of the auxiliary rotation device 28, form a closed system, with the electric machine 30 and the dedicated electrical storage device 32 forming part of an integrated package 36. In other words, the auxiliary rotation device 28 and the electric machine 30 are self-contained. Consequently, during powered operation of the gas turbine engine 10 (i.e. when the electric machine is operating in generating mode) the dedicated electrical storage device 32 can only be charged by the electrical energy produced by the electric machine 30, and following powered operation of the gas turbine engine 10 (i.e. when the electric machine is operating in motor mode) the electric machine 30 can only be powered by the electrical energy stored within the dedicated electrical storage device 32. This prevents the dedicated electrical storage device 32 discharging to other components to the extent that it is unable to power rotation of the rotor assembly of the high-pressure compressor 14.

The arrangement disclosed above also allows the capacity of the dedicated electrical storage device 32 to be optimised. Specifically, the capacity of the dedicated electrical storage device 32 can be chosen such that during the period of powered operation of the gas turbine engine 10 (i.e. during step S6), the dedicated electrical storage device 32 is fully charged, and such that the dedicated electrical storage device 32 discharges to such an extent that insufficient charge remains in the dedicated electrical storage device 32 to power the electric machine 30 to rotate the rotor assembly of the high-pressure compressor 14 (i.e. step S12) only after a predetermined amount or period of rotation of the rotor assembly of the high-pressure compressor 14 (and thus a predetermined level of cooling thereof) has occurred. The capacity of the dedicated electrical storage device 32 can be minimised so as to only hold enough electrical energy to provide this predetermined amount or period of rotation. Accordingly, the physical size, weight and cost of the dedicated electrical storage device 32 can be optimised. Since the duty cycle of the electrical storage device 32 is low, the minimum size and weight of the electrical storage device 32 is relatively small.

It has been described that a single auxiliary rotation device 28 is positioned within the high-pressure compressor casing 25 adjacent the rotor assembly of the high-pressure compressor 14. Further, it has been described that the electric machine 30 of the auxiliary rotation device 28 converts a portion of the mechanical energy of the rotor assembly of the high-pressure compressor 14 into electrical energy, and subsequently uses this energy to power rotation of the rotor assembly of the high-pressure compressor 14 after the period of powered operation of the gas turbine engine 10. However, the single auxiliary rotation device 28 can be used in conjunction with any of the rotor assemblies of the gas turbine (e.g. any of the intermediate pressure compressor 13, the high-pressure compressor 14, the high-pressure turbine 16, the intermediate pressure turbine 17 or the low-pressure turbine 18).

In addition, multiple auxiliary rotation devices corresponding to the auxiliary rotation device 28 can be used in conjunction with more than one of the rotor assemblies of the gas turbine. In some arrangements, all of the rotor assemblies of the gas turbine engine 10 (or at least all of the rotor assemblies of the main gas generator section 8 of the gas turbine engine 10) may be provided (either directly or indirectly) with an auxiliary rotation device. Accordingly, all of the rotor assemblies of the gas turbine engine 10 can be rotated following the period of powered operation of the gas turbine engine 10, such that none of the rotor assemblies experience rotor bow, and thus damage is completely eliminated or reduced.

Although it has been described that the auxiliary rotation device 28 is positioned within the main gas generator section 8, it could be positioned within any suitable part of the gas turbine engine 10. For example, the auxiliary rotation device 28 could be attached to a gearbox (not shown) of the gas turbine engine 10.

Although it has been described that the rotor assembly of the high-pressure compressor 14 does not stop rotating between the end of the period of powered operation of the gas turbine engine 10 and the electric machine 30 beginning to operate in generator mode, it may do so in other arrangements.

Although it has been described that the dedicated electrical storage device 32 is a battery, it could alternatively be a capacitor.

The auxiliary rotation device 28 may be used with the gas turbine engine 10 of an aircraft, for example. Alternatively, it could equally be used with any other type of gas turbine engine, such as a gas turbine engine for a marine application.

We claim:

1. A gas turbine engine comprising an auxiliary rotation device, the auxiliary rotation device comprising:
    an electric machine configured to be coupled to a rotor of the gas turbine engine; and
    a dedicated electrical storage device coupled to the electric machine;
    wherein:
    during a period of powered operation of the gas turbine engine the electric machine is configured to act as a generator so as to charge the dedicated electrical storage device and following the period of powered operation of the gas turbine engine the electric machine is configured to act as a motor by discharging the dedicated electrical storage device so as to cause the rotor to rotate for a period of time to provide even cooling of the rotor around its circumference;
    the electric machine ceases to rotate the rotor when the dedicated electrical storage device is discharged such that insufficient charge remains to rotate the rotor; such that the period of time over which the rotor rotates is determined by the capacity of the dedicated electrical storage device; and
    the dedicated electrical storage device is configured to hold a predetermined amount of electrical energy to provide a predetermined amount of rotation.

2. The turbine engine comprising an auxiliary rotation device as claimed in claim 1, wherein the electric machine is configured to automatically begin rotating the rotor following the period of powered operation of the gas turbine engine.

3. The gas turbine engine comprising an auxiliary rotation device as claimed in claim 1, wherein the dedicated electrical storage device is configured to automatically discharge when it is no longer being charged following the period of powered operation of the gas turbine engine.

4. The gas turbine engine comprising an auxiliary rotation device as claimed in claim 1, wherein the capacity of the dedicated electrical storage device is such that during the period of powered operation of the gas turbine engine, the dedicated electrical storage device is fully charged.

5. The gas turbine engine comprising an auxiliary rotation device as claimed in claim 1, wherein the rotor is a rotor of a compressor and/or a turbine.

6. The gas turbine engine comprising an auxiliary rotation device as claimed in claim 1, wherein the dedicated electrical storage device is a battery or a capacitor.

7. The gas turbine engine comprising an auxiliary rotation device as claimed in claim 1, wherein the electrical energy stored in the dedicated electrical storage device solely powers the electric machine.

8. The gas turbine engine comprising an auxiliary rotation device as claimed in claim 1, wherein the electric machine is configured to rotate the rotor at a rate of between 0.1 and 20 revolutions per minute.

9. The gas turbine engine according to claim 1, further comprising:
   a compressor comprising a compressor rotor;
   a turbine comprising a turbine rotor; and
   a shaft connecting the compressor rotor to the turbine rotor, wherein:
   the electric machine of the auxiliary rotation device is coupled to one or more of the compressor rotor, turbine rotor and shaft.

10. An aircraft comprising the gas turbine engine as claimed in claim 1.

11. The gas turbine engine according to claim 1, wherein electric machine and the dedicated electrical storage device form a closed system such that the dedicated electrical storage device can only be charged by electrical energy produced by the electric machine during powered operation of the gas turbine engine, and the electric machine can only be powered by electrical energy stored within the dedicated electrical storage device following powered operation of the gas turbine engine.

12. The gas turbine engine according to claim 1, wherein the sole electrical input into the dedicated electrical storage device is from the electric machine.

13. A method of cooling a rotor of a gas turbine engine using an auxiliary rotation device, the method comprising:
   during a period of powered operation of the gas turbine engine, charging a dedicated electrical storage device of the auxiliary rotation device via an electric machine of the auxiliary rotation device acting as a generator coupled to the rotor of the gas turbine engine;
   following the period of powered operation of the gas turbine engine, discharging the dedicated electrical storage device such that the electric machine acts as a motor so as to cause the rotor to rotate for a period of time to provide even cooling of the rotor around its circumference,
   wherein:
   the electric machine ceases to rotate the rotor when the dedicated electrical storage device is discharged such that insufficient charge remains to rotate the rotor; such that the period of time over which the rotor rotates is determined by the capacity of the dedicated electrical storage device; and
   the dedicated electrical storage device is configured to hold a predetermined amount of electrical energy to provide a predetermined amount of rotation.

14. The method as claimed in claim 13, wherein the electric machine automatically begins rotating the rotor following the period of powered operation of the gas turbine engine.

15. The method as claimed in claim 13, wherein the dedicated electrical storage device automatically discharges when it is no longer being charged following the period of powered operation of the gas turbine engine.

16. The method as claimed in claim 13, wherein the capacity of the dedicated electrical storage device is such that during the period of powered operation of the gas turbine engine, the dedicated electrical storage device is fully charged.

* * * * *